United States Patent
Martin et al.

(10) Patent No.: US 6,988,135 B2
(45) Date of Patent: Jan. 17, 2006

(54) METHOD AND SYSTEM FOR SPECIFYING A CACHE POLICY FOR CACHING WEB PAGES WHICH INCLUDE DYNAMIC CONTENT

(75) Inventors: Brian Keith Martin, Cary, NC (US); Daniel Christopher Shupp, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 09/784,694

(22) Filed: Feb. 15, 2001

(65) Prior Publication Data

US 2002/0112032 A1    Aug. 15, 2002

(51) Int. Cl.
G06F 15/173    (2006.01)

(52) U.S. Cl. .............. 709/224; 709/223; 709/214; 709/216

(58) Field of Classification Search ............... 709/206, 709/212–219, 223–224, 225, 227–228, 231
See application file for complete search history.

(56) References Cited

U.S. PATENT DOCUMENTS

| | | | | |
|---|---|---|---|---|
| 6,094,662 A * | 7/2000 | Hawes | ............ | 707/104.1 |
| 6,098,064 A * | 8/2000 | Pirolli et al. | ............ | 707/2 |
| 6,185,608 B1 * | 2/2001 | Hon et al. | ............ | 709/216 |
| 6,253,234 B1 * | 6/2001 | Hunt et al. | ............ | 709/213 |
| 6,275,833 B1 * | 8/2001 | Nakamura et al. | ............ | 715/513 |
| 6,321,209 B1 * | 11/2001 | Pasquali | ............ | 705/14 |
| 6,324,565 B1 * | 11/2001 | Holt, III | ............ | 709/203 |
| 6,457,103 B1 * | 9/2002 | Challenger et al. | ............ | 711/133 |
| 6,516,349 B1 * | 2/2003 | Lieberman | ............ | 709/225 |
| 6,523,063 B1 * | 2/2003 | Miller et al. | ............ | 709/206 |
| 6,606,525 B1 * | 8/2003 | Muthuswamy et al. | ............ | 700/52 |
| 6,640,240 B1 * | 10/2003 | Hoffman et al. | ............ | 709/203 |
| 6,701,321 B1 * | 3/2004 | Tsai | ............ | 707/102 |
| 2002/0004813 A1 * | 1/2002 | Agrawal et al. | ............ | 709/201 |
| 2002/0065899 A1 * | 5/2002 | Smith et al. | ............ | 709/214 |
| 2002/0107935 A1 * | 8/2002 | Lowery et al. | ............ | 709/216 |

OTHER PUBLICATIONS

Microsoft Computer Dictionary 5th Edition, p. 475.*

* cited by examiner

Primary Examiner—Ario Etienne
Assistant Examiner—Hussein El-chanti
(74) Attorney, Agent, or Firm—Yee & Associates P.C.; A. Bruce Clay (57) ABSTRACT

A data processing system and method are described for specifying a cache policy for caching pages which include dynamic content. A user is permitted to request a page to be displayed. The page includes multiple fragments. An application is executed which generates those fragments. The generation of fragments is are unchanged by the caching policy. Each one of the servlets is executed to present a different one of the fragments. Caching of the page fragments can now be processed separately from the execution of the application.

42 Claims, 9 Drawing Sheets

METHOD AND SYSTEM FOR SPECIFYING A CACHE POLICY FOR CACHING WEB PAGES WHICH INCLUDE DYNAMIC CONTENT

FIELD OF THE INVENTION

The present invention relates generally to data processing systems, and more particularly to caching data in a data processing system. Still more particularly, the present invention relates to a data processing system, method, and product for caching WEB pages which include dynamic content.

BACKGROUND OF THE INVENTION

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A URL includes a Uniform Resource Identifier (URI). The URI is the portion of the URL which more specifically identifies a particular page to be displayed.

A browser is a program capable of submitting a request for information identified by a URL at the client machine. Retrieval of information on the Web is generally accomplished with an HTML-compatible browser.

Web content is often dynamic. In the modern Internet, personalization of content to specific users and groups necessitates dynamic content, as does changing content due to user actions (e.g. shopping carts change, though your request for that cart does not). Even static pages are occasionally updated. Web servers provide static content and dynamic content to various users. Static content contain data from files stored at a server. Dynamic content is constructed by programs, including such technologies as servlets, ASPs, and CGI, executing at the time a request is made. The presence of dynamic content often slows down Web sites considerably. High-performance Web servers can typically deliver several hundred static pages per second. By contrast, the rate at which dynamic pages are delivered is often one or two order of magnitudes slower.

Dynamic content is often present at a Web site in an effort to provide customized pages and updated information to various users that may visit the site. The use of this type of Web page, however, may cause a Web site to slow down in performance.

In the generic web application environment, dynamic content is generated (e.g. by executing a servlet) for every request. A dynamic web cache allows a dynamically generated page to be cached and later served in response to future requests without regenerating its output (without executing that servlet again). The first time a request is made for dynamic content, the application executes the appropriate servlets necessary to display the page. The output of these servlets is typically HTML code which is then presented to the user. Other types output include XML and images such as GIFs and JPGs. When a user requests a page for the first time, the servlets execute and the code is stored as a cache entry. Each subsequent time the user requests this page, this cache entry is retrieved and presented to the user. When the page is to be refreshed, the application executes all of the servlets again to create a new cache entry.

The method described above for caching dynamic content can be applied to entire pages, requested externally by users. This method is inflexible, and often inefficient, as whole pages are generally constructed from several dynamic fragments. Frequently, the content of only parts of a page may change. In these cases, valuable computing resources are wasted by regenerating those parts of the page which were not changed.

Some applications include a caching capability within the application itself. Each application may choose to implement caching in a unique manner. The form of the servlets will vary from one application to the next. In these systems, each servlet must know how to generate its own cache entry. Therefore, in order to change the way the dynamic content is cached, each servlet, in each application, must be changed. Further, with this approach, each application must provide for its own caching, which cannot be applied to other applications. Existing applications which do not currently provide for caching must be updated in order to permit caching.

In these systems, some servlets are cacheable, and some are not. When a servlet is cacheable, the servlet includes the information necessary to generate its cache entry.

Therefore, a need exists for a data processing system and method for specifying a caching policy for caching dynamic content including portions of pages and supporting both internal and external requests, where caching is executed separately from applications.

SUMMARY OF THE INVENTION

A data processing system and method are described for specifying a cache policy for caching pages which include dynamic content. A user is permitted to request a page to be displayed. The page includes multiple fragments. An application is executed which generates those fragments. The generation of fragments is unchanged by the caching policy. Each one of the servlets is executed to present a different one of the fragments. Caching of the page fragments can now be processed separately from the execution of the application.

The above as well as additional object, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a system, method, and product for specifying a cache policy for caching pages which include dynamic content. A user is permitted to request a page to be displayed. The page includes multiple fragments. An application is executed which includes multiple servlets. Each one of the servlets is executed to present a different one of the fragments. Dynamic content is constructed by programs, including such technologies as servlets, ASPs, and CGI, executing at the time a request is made. For the purposes of the following description, it is assumed that servlets are the technology being used to implement dynamic content. However, those skilled in the art will recognize that the present invention may be utilized when any of the different technologies are used to implement dynamic content.

Each servlet was written without regard to caching. The servlets are stored on an application server disk. For each servlet, caching options are specified inside a separate XML file dedicated to the task of storing cache policies. A servlet element is created for each servlet, which uniquely identifies that servlet. The servlet element includes an indication of the caching options for the servlet.

During initialization of the Web Application, the present invention receives a cache policy file. This file contains a listing of servlet elements. Each servlet element specifies a set of caching options and specifies a servlet to which those options apply. From that file it will build a list in memory of servlets that are to be cached, and associate the specified options with those servlets.

When a user requests a document to be displayed, the servlets that generate that document are initialized, if initialization has not already occurred. Each servlet identified by a servlet element included in the request is located and loaded from disk to the application server's memory. For each servlet, if it is to be cached, the cache options specified for it are associated with the servlet in memory.

A cache identifier is then generated for each servlet. The cache options for a servlet describe how to use the information included in the document request to build a cache identifier.

The present invention then searches to attempt to locate a cache entry which is identified by the newly generated cache identifier. The first time a user requests an output which is generated by a particular servlet, no cache entry will be found. In this case, a cache entry must be generated. To generate a cache entry for a particular servlet, the servlet is executed and generates output, typically HTML. This output is saved utilizing the cache identifier as the cache entry's identifier. This output is then returned and presented to the user.

Subsequent times the user requests the output which is generated by the particular servlet, the present invention will be able to locate that cache entry having the particular cache identifier. In these cases, the contents of the cache entry are then retrieved and the output is returned and presented to the user.

A user may only request an entire page, but the execution of that page may involve requesting additional dynamic fragments. Since each fragment may have its own request, each fragment will have its own cache entry. When a requested fragment does not have an associated cache entry, a cache entry is created by executing only the servlet associated with the fragment. In this manner, the entire page need not be cached in order to update only a portion of the page.

The present invention provides for specifying and executing caching policies separately from the execution of an application. In this manner, the caching policy may be applied to existing applications. The servlets of the existing applications need not be modified in order to execute the present invention.

Figure 1:
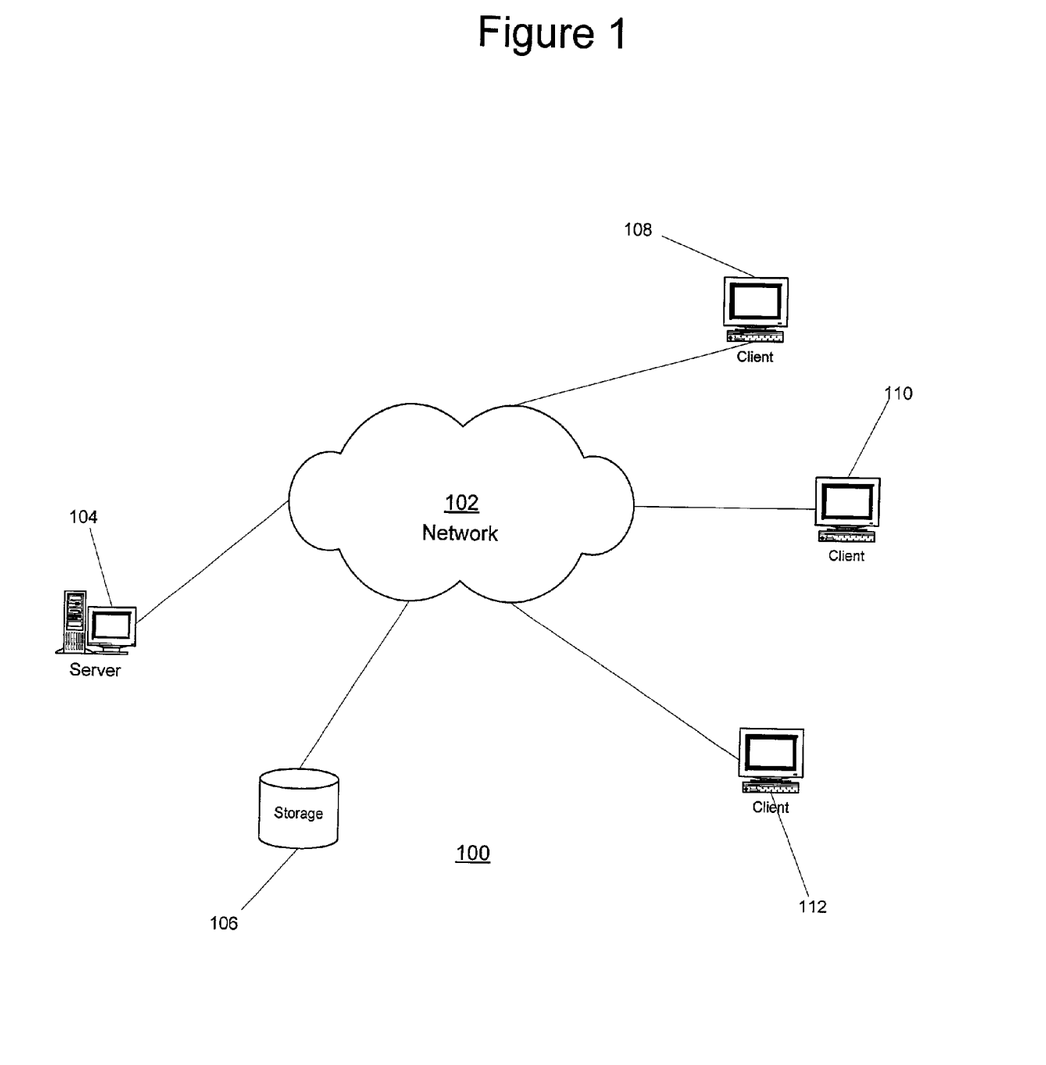
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 includes a server system 114, which also may provide data to clients 108–112. Server system 114 may take various forms. For example, server system 114 may consist of two or more servers that have been logically associated with each other or may actually be interconnected as a cluster. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
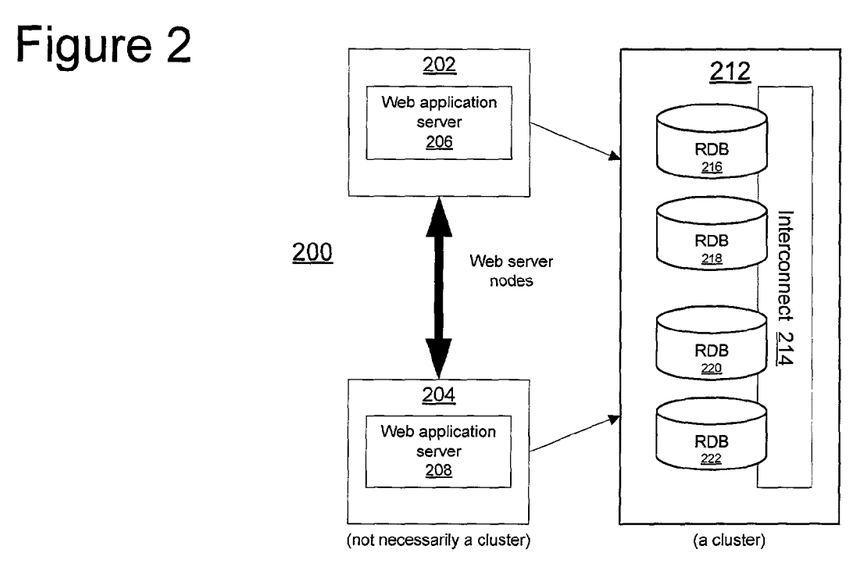
FIG. 2 is a block diagram of a server system depicted in accordance with a preferred embodiment of the present invention.

With reference now to FIG. 2, a block diagram of a server system is depicted in accordance with a preferred embodiment of the present invention. Server system 200 is an example of a server system that may be implemented as server system 114 in FIG. 1. Server system 200 illustrates a mechanism in which a Web application achieves throughput scale up and high availability. In this example, server system 200 contains Web server nodes 202 and 204, which execute Web application servers 206 and 208 respectively. The use of the term "server" may refer to either the physical data processing system or to an application providing receiving and processing requests from a client. Similarly, the client may be a physical data processing system or an application. For example, a client application would be a Web browser.

Web server nodes 202 and 204 typically coordinate via shared data (e.g., a distributed file system or database system). These data mechanisms can themselves scale up via their own form of parallelism. In the depicted example, this sharing of data is accomplished through shared parallel database 212, which contains an interconnect 214 providing a connection between storage devices 216–222. These storage devices form a cluster and are shared by both Web server node 202 and Web server node 204. These storage devices contain relational databases from which content is pulled by Web server nodes 202 and 204 to dynamically create pages.

The depicted configuration for server system 200 is intended as an example and is not meant to imply architectural limitations with respect to the present invention.

Figure 3:
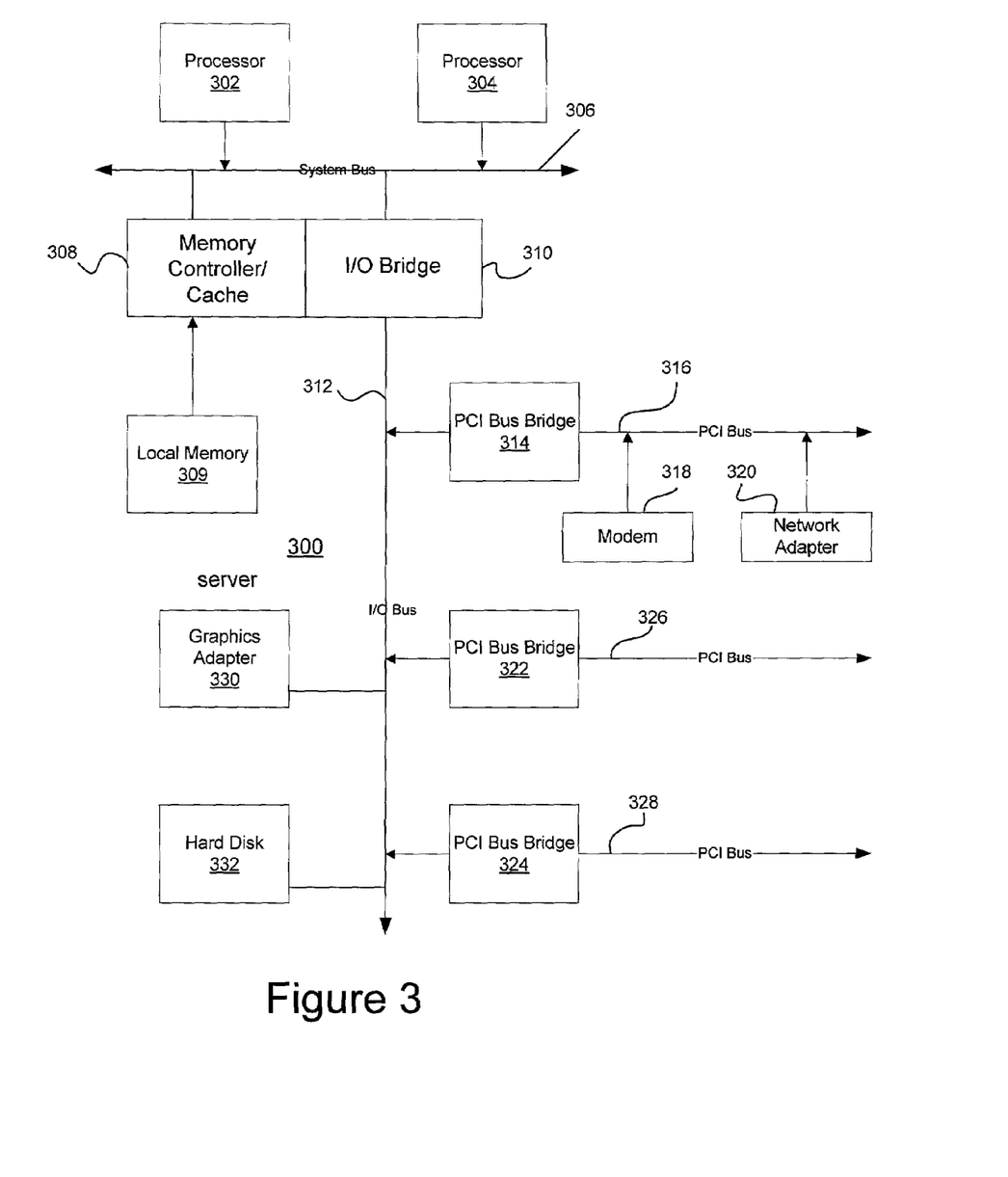
FIG. 3 is a block diagram depicting a data processing system that may be implemented as a server in accordance with a preferred embodiment of the present invention.

Referring to FIG. 3, a block diagram depicts a data processing system that may be implemented as a server, such as server 104 in FIG. 1, Web server node 202, or Web server node 204, in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 108–112 in FIG. 1 may be provided through modem 318 and network adapter 220 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
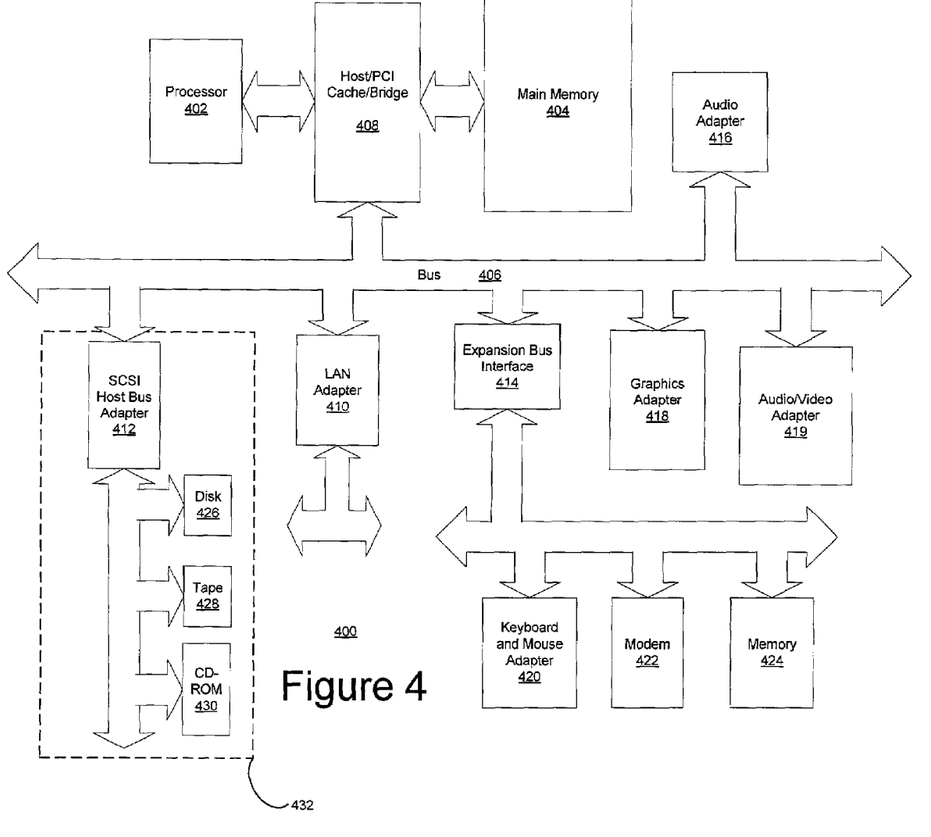
FIG. 4 is a block diagram illustrating a data processing system in which the present invention may be implemented.

With reference now to FIG. 4, a block diagram illustrates a data processing system in which the present invention may be implemented. Data processing system 400 is an example of a client computer. Data processing system 400 employs a peripheral component interconnect (PCI) local bus architecture. Although the depicted example employs a PCI bus, other bus architectures such as Micro Channel and ISA may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4 denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The present invention provides a method, apparatus, and instructions for caching dynamic content. The mechanism of the present invention is especially useful in caching Web content, such as Web pages. In particular, the mechanism of the present invention may be used to provide caching for Web pages containing data having different rates of change.

Figure 5:
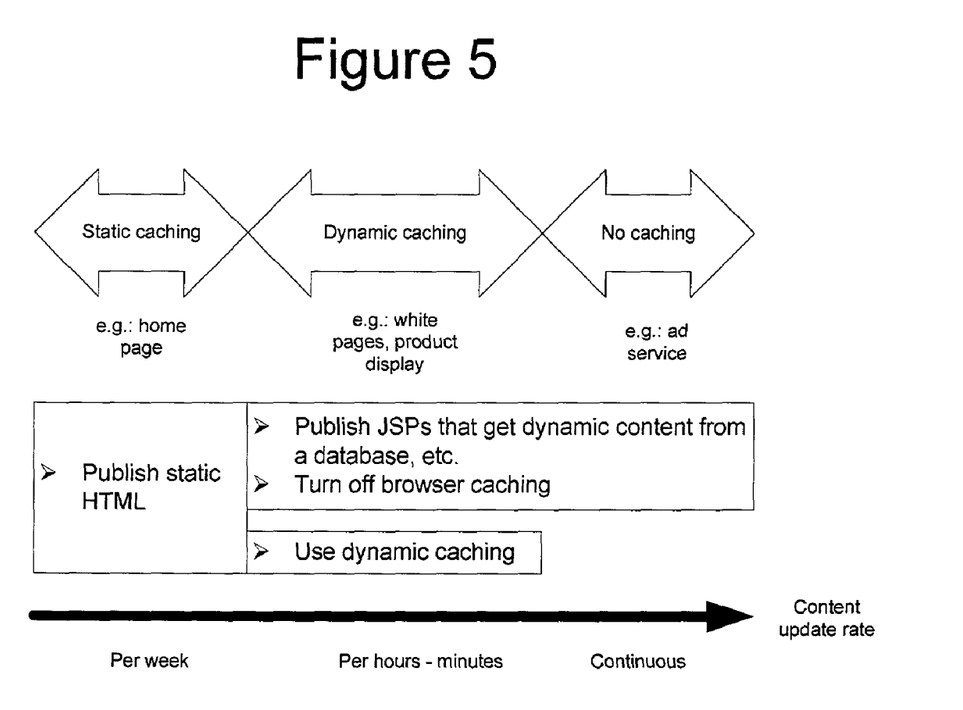
FIG. 5 is a diagram illustrating examples of different update rates and caching for pages depicted in accordance with a preferred embodiment of the present invention.

Turning to FIG. 5, a diagram illustrating examples of different update rates and caching for pages is depicted in accordance with a preferred embodiment of the present invention. FIG. 5 shows update rates for various types of pages as well as the type of caching that may be used.

Generally, caching is more beneficial as the access rate increases and as the update rate decreases. All Web content is somewhat dynamic because everything changes eventually, even static pages. For example, if content changes very infrequently, then it is convenient for a human to republish the Web site whenever its content changes. An example of this type of content is a typical home page. It is usually safe to enable browser caching.

If content changes so often that it is unreasonable to republish the Web site every time it changes, then a template, such as a Java Server Page (JSP), may be used to dynamically get the content from a file or database, and then render (i.e., format) the content into an HTML page. An ad service is an example of content that may change each time a page is requested. A JSP and a servlet are both mechanisms, which use Java standards for programming dynamic content. A JSP is aimed at Web application designers and servlets are aimed at programmers. A JSP is compiled into a servlet for execution. In this case, static caching in browsers may be disabled, and dynamic caching may or may not be useful.

If the content is constant over a large number of requests, then performance can be significantly improved by using dynamic caching. Examples of content that is fairly consistent are products in e-commerce and white pages as shown in FIG. 5. With dynamic caching, either time limit or a data ID invalidation mechanism can be used to keep the content in the cache up to date. One way to view this case is that it automates the publishing process so that high update rates can be handled.

If the content changes continuously, such as, for example, a ticker tape, any form of caching is a bad idea because caching overhead is suffered with no benefit. JSPs may be used to generate a page containing this content without any caching.

Figure 6:
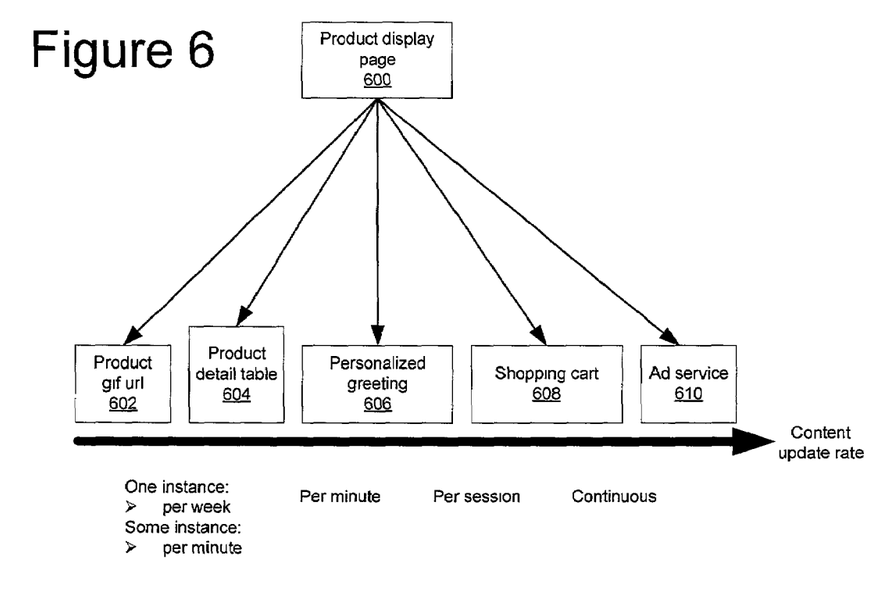
FIG. 6 is a diagram illustrating page fragments depicted in accordance with a preferred embodiment of the present invention.

With reference now to FIG. 6, a diagram illustrating page fragments is depicted in accordance with a preferred embodiment of the present invention. One mechanism provided by the present invention to provide improved caching of content is to define content in a page as one or more fragments and cache the fragments individually, rather than as a single page.

A fragment is a part or all of a rendered HTML page which can be cached. A fragment can contain 0 or more child fragments, and can be contained by 0 or more parent fragments, forming a directed acyclic graph (DAG). FIG. 6 illustrates a returned page 600, which is a product display page. Page 600 is a "top-level" fragment made up of 5 child fragments. Page 600 includes a product gif URL fragment 602, a product detail fragment 604, a personalized greeting fragment 606, a shopping cart fragment 608, and an ad service fragment 610. The fragments depicted in FIG. 6 are shown in order of increasing rate of change for the underlying content in the fragment with product gif URL 602 having the slowest rate of change and ad service fragment 610 having the fasted rate of change. Product gif URL fragment 602 contains a hypertext reference (HREF) that specifies the URL of the file for an image that shows what the product looks like.

Product detail fragment 604 in this example may be a formatted table that includes the detailed description of the product with details, such as the product order number, name, options, and price. Personalized greeting fragment 606 is a fragment including a greeting that is directed towards the user, such as, for example, "Hello, John! Welcome to AcmeCorp.". Shopping cart fragment 608 in this example is a formatted shopping cart, including the order number, name, quantity and price of the products that have been chosen for possible purchase.

Ad service fragment 610 includes a HREF for an image that displays an advertisement. The advertisement HREF is different each time a page is sent to a shopper. This makes page 600 as a whole too volatile to cache. However, fragment granularity allows the other portions of page 600 to be cached.

The HREF to the product image in product gif URL fragment 602 and the detailed product description in product detail table fragment 604 are excellent candidates for fragments to be cached because the underlying data of a particular product changes infrequently. However, the underlying data of some product changes far too frequently for static publishing.

The personalized greeting in personalized greeting fragment 606 has the lifetime of a user session, but only for a particular shopper. It may be used several times within a fairly short time interval. Thus, personalized greeting fragment 606 is a good candidate for dynamic caching. Shopping cart fragment 608 changes multiple times within a user session (every time something is added or the quantity changes), so it is not as good a candidate for dynamic caching as the personalized greeting. If, however, shopping cart fragment 608 is included on every page returned to the shopper, then shopping cart fragment 608 is typically returned several times between changes, so there is a reasonable case for caching it. The advertisement HREF in ad service fragment 610 is a poor candidate for caching because the hit ratio would be zero and caching has its own overhead (i.e., storing it in the cache and invalidating it). Of course, each child fragment may contain additional fragments.

Figure 7:
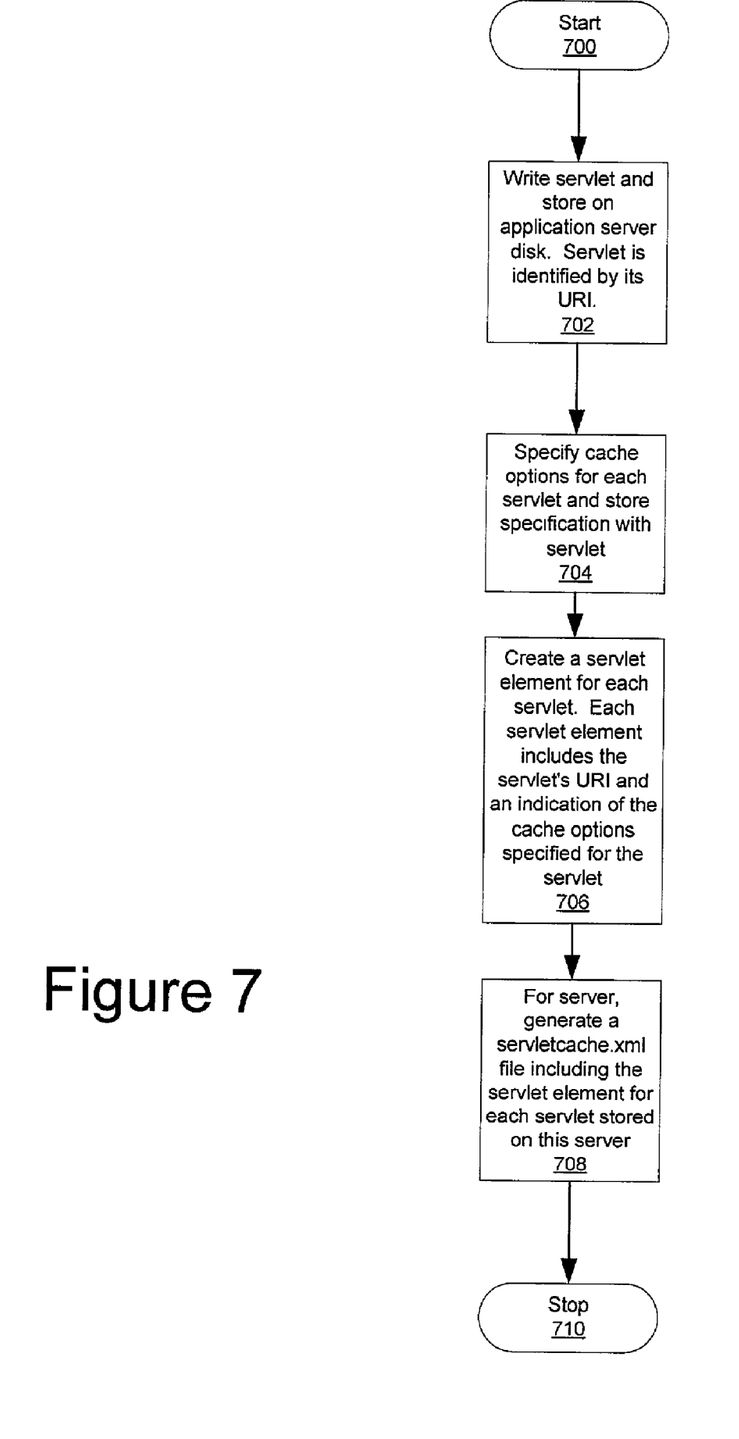
FIG. 7 is a high level flow chart which depicts the creation of a servlet and a servlet element which uniquely identifies a cacheable servlet in accordance with the present invention.

FIG. 7 is a high level flow chart which depicts the creation of a servlet and a servlet element which uniquely identifies a cacheable servlet in accordance with the present invention. The process starts as illustrated by block 700 and thereafter passes to block 702 which depicts a programmer writing a servlet and the storage of the servlet on the application server disk. The servlet is identified by its URI. Next, block 704 illustrates the specification of cache options for each servlet. These cache options may include everything a dynamic cache will need both to correctly store dynamic data n the cache and to generate a correct cache identifier (cache ID) from the information supplied to that servlet. Thereafter, block 706 depicts the creation of a servlet element for each cacheable servlet. Each servlet element includes the servlet's URI and an indication of the cache options specified for that servlet. Block 708, then, illustrates generating a servletcache.xml file for a server which includes the servlet element for each servlet stored on this server. The process then terminates as depicted by block 710.

Figure 8:
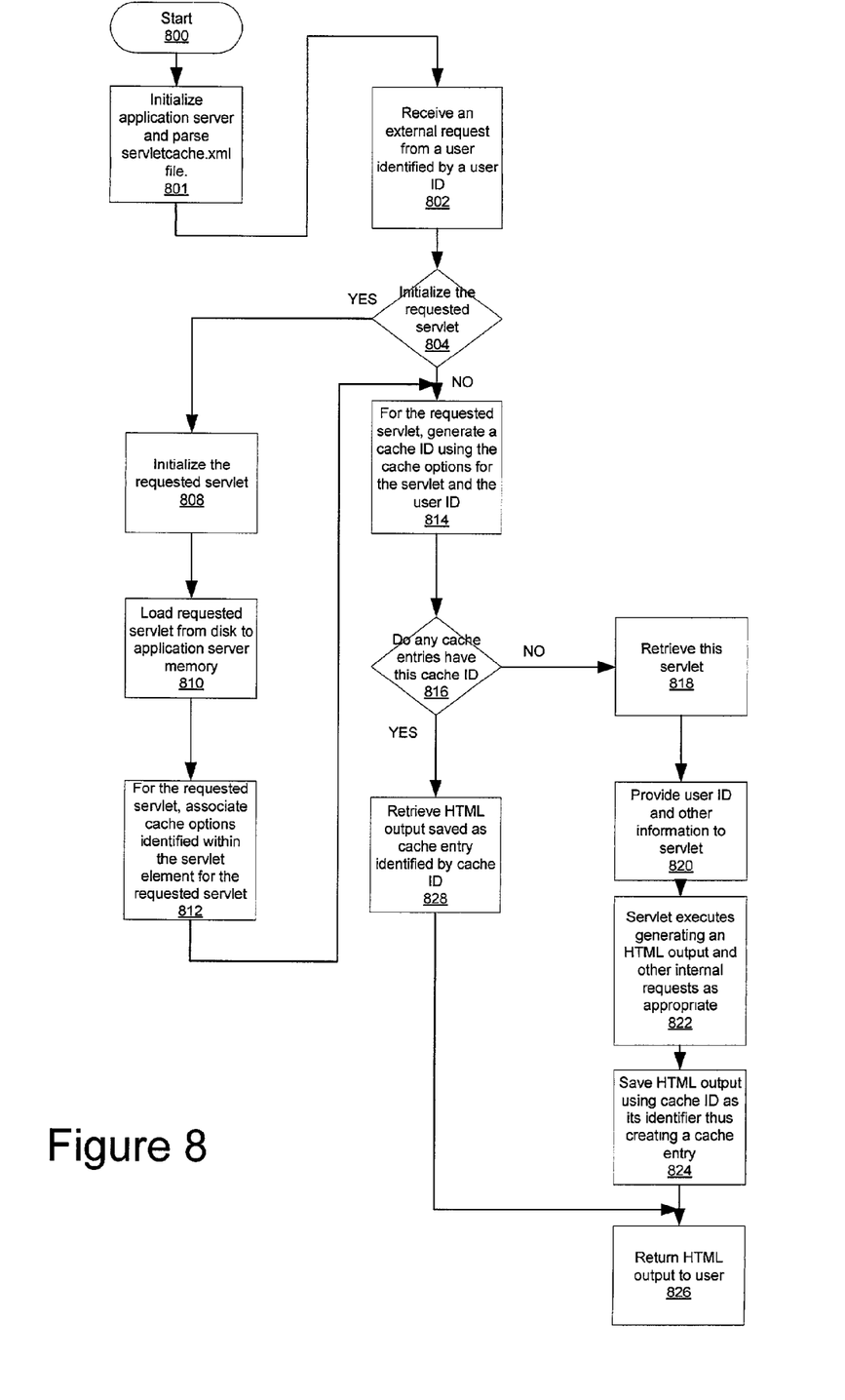
FIG. 8 is a high level flow chart which illustrates processing an external request for a servlet in accordance with the present invention.

FIG. 8 is a high level flow chart which illustrates processing a sample external request for a servlet in accordance with the present invention. The process starts as depicted by block 800 and thereafter passes to block 801 which depicts initializing an application server and parsing a cache policy file, servletcache.xml. The servletcache.xml file is stored on the application server disk and includes a servlet element for each cacheable servlet stored on the server. Next, block 802 which illustrates the receipt of an external request for a servlet from a user. The user is (in this example) identified by a user identifier (user ID). Thereafter, block 804 depicts a determination of whether or not the servlet needs to be initialized. If a determination is made that the requested servlet does need to be initialized, the process passes to block 808 which depicts initializing the requested servlet. The process then passes to block 810 which illustrates loading the requested servlet from the application server disk to the application server memory. Next, block 812 depicts associating cache options identified within the servlet element with the requested servlet. The process then passes to block 814.

Referring again to block 804, if a determination is made that the requested servlet does not need to be initialized, the process passes to block 814. Block 814 depicts generating a cache identifier (cache ID) for the requested servlet. The cache identifier is generated using the cache options for the particular servlet and the user ID. Next, block 816 illustrates a determination of whether or not any existing cache entries have this particular cache ID. The first time a user retrieves a page including a particular servlet, no cache entry will exist having the particular cache ID. If a determination is made that no cache entry exists with the particular cache ID, the process passes to block 818 which depicts retrieving the requested servlet. Next, block 820 illustrates providing the user ID and other information to the servlet. Thereafter, block 822 depicts the servlet executing and generating an HTML output. The servlet may also generate internal requests. Block 824 illustrates saving the HTML output using the cache ID as its identifier. This is then a cache entry which is identified by the particular cache ID. The process then passes to block 826 which depicts returning the HTML output to the user by displaying this cache entry.

Referring again to block 816, if a determination is made that an existing cache entry is associated with this cache ID, the process passes to block 828 which illustrates retrieving the HTML output saved as a cache entry identified by this particular cache ID. The process then passes to block 826.

Figure 9:
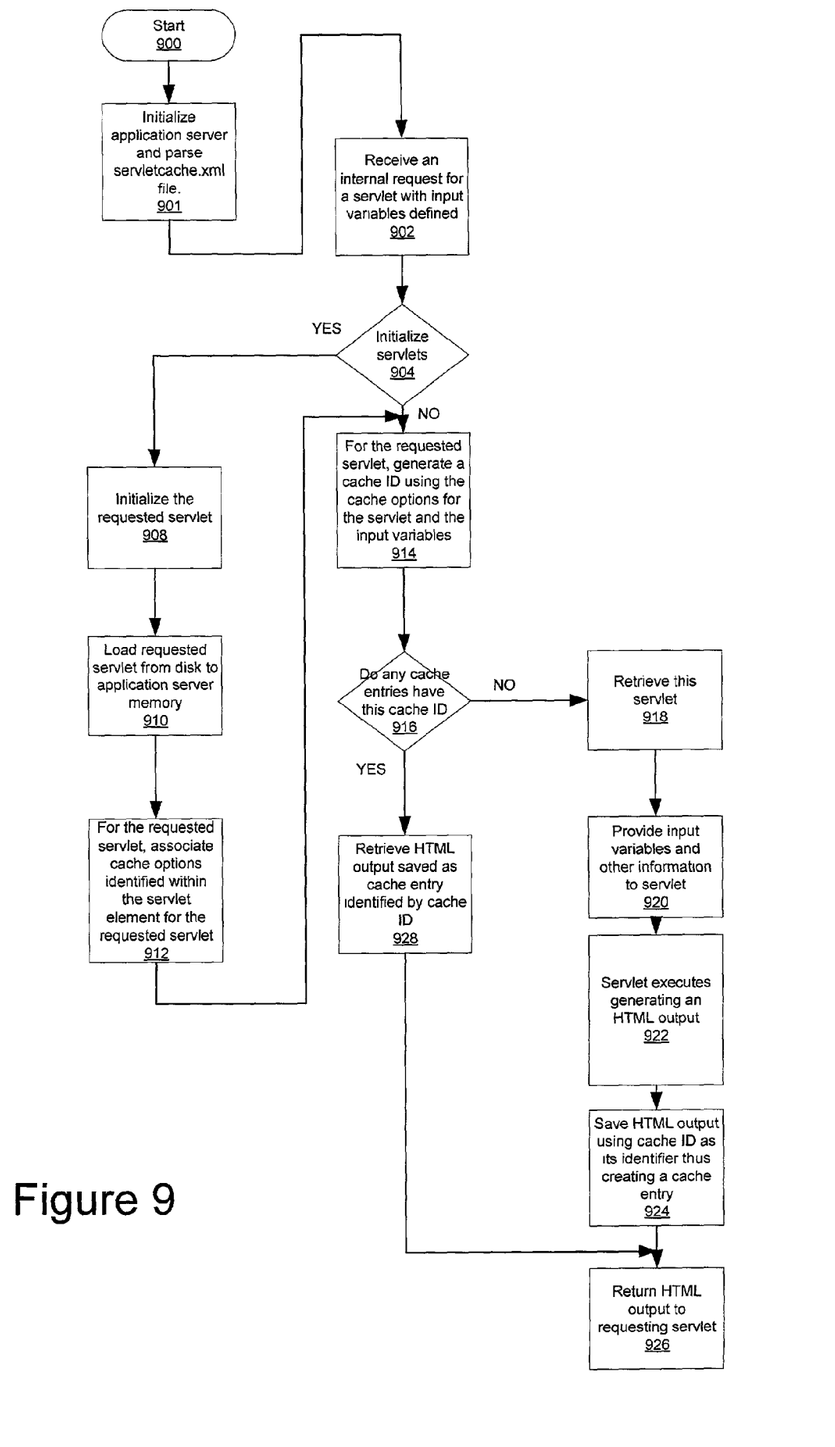
FIG. 9 is a high level flow chart which illustrates processing an internal request for a servlet in accordance with the present invention.

FIG. 9 is a high level flow chart which illustrates processing an internal request for a servlet in accordance with the present invention. The process starts as depicted by block 900 and thereafter passes to block 901 which depicts initializing an application server and parsing the cache policy file. Next, block 902 illustrates the receipt of an internal request for a servlet. The input variables are defined. Next, block 904 depicts a determination of whether or not the requested servlet needs to be initialized. If a determination is made that the requested servlet does need to be initialized, the process passes to block 908 which depicts initializing the requested servlet. The process then passes to block 910 which illustrates loading the requested servlet from the application server disk to the application server memory. Next, block 912 depicts associating cache options identified within the servlet element with the requested servlet. The process then passes to block 914.

Referring again to block 904, if a determination is made that the requested servlet does not need to be initialized, the process passes to block 914. Block 914 depicts generating a cache identifier (cache ID) for the requested servlet. The cache identifier is generated using the cache options for the particular servlet and the input variables. Next, block 916 illustrates a determination of whether or not any existing cache entries have this particular cache ID. If a determination is made that no cache entry exists with the particular cache ID, the process passes to block 918 which depicts retrieving the requested servlet. Next, block 920 illustrates providing the user ID and other information to the servlet. Thereafter, block 922 depicts the servlet executing and generating an HTML output. Block 924 illustrates saving the HTML output using the cache ID as its identifier. This is then a cache entry which is identified by the particular cache ID. The process then passes to block 926 which depicts returning the HTML output to the requesting servlet. Referring again to block 916, if a determination is made that an existing cache entry is associated with this cache ID, the process passes to block 928 which illustrates retrieving the HTML output saved as a cache entry identified by this particular cache ID. The process then passes to block 926.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for specifying a cache policy for caching pages which include dynamic content, said method comprising the steps of:
   permitting a user to request one of said pages to be displayed, said one of said pages including a plurality of fragments;
   executing an application which includes a plurality of servlets, each one of said plurality of servlets being executed to present a different one of said plurality of fragments, each one of said plurality of servlets being unchanged by said caching policy;
   processing caching of said one of said pages separately from said application; and
   specifying one of a plurality of different caching options for one of said plurality of fragments based on an update rate of content of said one of said plurality of servlets, said plurality of different caching options including either static caching, dynamic caching or no caching, content that is updated dynamically being cached using either static caching, dynamic caching, or no caching.

2. The method according to claim 1, further comprising the steps of processing caching of each of said plurality of fragments separately from said application.

3. The method according to claim 1, wherein the step of processing caching further comprises the steps of:
   responding to internal cache requests; and
   responding to external cache requests.

4. The method according to claim 1, further comprising the step of processing caching of said one of said pages within an application server included within said computer system.

5. The method according to claim 4, further comprising the steps of:
   responding to internal cache requests, said internal cache requests being generated within said application server, and
   responding to external cache requests, said external cache requests being generated outside said application server.

6. The method according to claim 1, wherein the step of processing caching of said one of said pages further comprises the steps of:
   receiving a request to display one of said plurality of fragments;
   determining one of plurality of servlets associated with said one of said plurality of fragments; and
   executing said one of said plurality of servlets, wherein said execution of said one of said plurality of servlets generates a displayable output.

7. The method according to claim 6, further comprising the steps of:
   in response to a first request to display said one of said plurality of fragments, creating a cache entry including said output;
   creating a cache entry identifier for identifying said cache entry utilizing a user identifier which identifies said user and caching options specified for said one of said plurality of servlets.

8. The method according to claim 7, further comprising the steps of:
   creating said one of said plurality of servlets;
   specifying said cache options for said one of said plurality of servlets; and
   creating a servlet element for said servlet utilizing a servlet identifier and an indication of said specified cache options, wherein said servlet element is associated with said servlet.

9. The method according to claim 8, further comprising the steps of:
   storing said servlet; and
   storing said specification of said servlet options with said servlet.

10. The method according to claim 8, further comprising the steps of:
    receiving a request to display said servlet element;
    determining whether any cache entry is identified by said cache identifier;
    in response to a determination that no cache entry is identified by said cache identifier:
      retrieving said servlet associated with said servlet element;
      providing said user identifier to said servlet;
      executing said servlet utilizing said user identifier generating an output;
      storing said output as a cache entry;
      identifying said cache entry utilizing said cache identifier; and
      returning said cache entry to said user, wherein said output is displayed.

11. The method according to claim 8, further comprising the steps of:
    receiving a request to display said servlet element;
    determining whether any cache entry is identified by said cache identifier;
    in response to a determination that a cache entry exists which is identified by said cache identifier, returning said cache entry to said user, wherein said output is displayed.

12. The method according to claim 6, further comprising the step of outputting said cache entry, wherein said one of said plurality of fragments is displayed.

13. The method according to claim 6, further comprising the step of in response to subsequent requests to display said one of said plurality of fragments, retrieving said cache entry utilizing said cache identifier.

14. The method according to claim 13, further comprising the step of outputting said cache entry, wherein said one of said plurality of fragments is displayed.

15. A data processing system for specifying a cache policy for caching pages which include dynamic content, comprising:
said data processing system for executing an application which includes a plurality of servlets, each one of said plurality of servlets being executed to present a different one of a plurality of fragments included within a page, each one of said plurality of servlets being unchanged by said caching policy;
said data processing system for processing caching of said one of said pages separately from said application; and
one of a plurality of different caching options specified for one of said plurality of fragments based on an update rate of content of said one of said plurality of servlets, said plurality of different caching options including either static caching, dynamic caching or no caching, content that is updated dynamically being cached using either static caching, dynamic caching, or no caching.

16. The system according to claim 15, further comprising said data processing system for processing caching of each of said plurality of fragments separately from said application.

17. The system according to claim 15, further comprising:
said data processing system for responding to internal cache requests; and
said data processing system for responding to external cache requests.

18. The system according to claim 15, further comprising said data processing system for processing caching of said one of said pages within an application server included within said computer system.

19. The system according to claim 18, further comprising:
said data processing system for responding to internal cache requests, said internal cache requests being generated within said application server; and
said data processing system for responding to external cache requests, said external cache requests being generated outside said application server.

20. The system according to claim 15, further comprising:
said data processing system for receiving a request to display one of said plurality of fragments;
said data processing system for determining one of plurality of servlets associated with said one of said plurality of fragments; and
said data processing system for executing said one of said plurality of servlets, wherein said execution of said one of said plurality of servlets generates a displayable output.

21. The system according to claim 20, further comprising:
said data processing system for in response to a first request to display said one of said plurality of fragments, creating a cache entry including said output;
said data processing system for creating a cache entry identifier for identifying said cache entry utilizing a user identifier which identifies said user and caching options specified for said one of said plurality of servlets.

22. The system according to claim 21, further comprising:
said data processing system for creating said one of said plurality of servlets;
said data processing system for specifying said cache options for said one of said plurality of servlets; and
said data processing system for creating a servlet element for said servlet utilizing a servlet identifier and an indication of said specified cache options, wherein said servlet element is associated with said servlet.

23. The system according to claim 22, further comprising:
said data processing system for storing said servlet; and
said data processing system for storing said specification of said servlet options with said servlet.

24. The system according to claim 22, further comprising:
said data processing system for receiving a request to display said servlet element;
said data processing system for determining whether any cache entry is identified by said cache identifier,
said data processing system in response to a determination that no cache entry is identified by said cache identifier:
for retrieving said servlet associated with said servlet element;
for providing said user identifier to said servlet;
for executing said servlet utilizing said user identifier generating an output;
for storing said output as a cache entry;
for identifying said cache entry utilizing said cache identifier; and
for returning said cache entry to said user, wherein said output is displayed.

25. The system according to claim 22, further comprising:
said data processing system for receiving a request to display said servlet element;
determining whether any cache entry is identified by said cache identifier;
said data processing system for in response to a determination that a cache entry exists which is identified by said cache identifier, returning said cache entry to said user, wherein said output is displayed.

26. The system according to claim 20, further comprising said data processing system for outputting said cache entry, wherein said one of said plurality of fragments is displayed.

27. The system according to claim 20, further comprising said data processing system for in response to subsequent requests to display said one of said plurality of fragments, retrieving said cache entry utilizing said cache identifier.

28. The system according to claim 27, further comprising said data processing system for outputting said cache entry, wherein said one of said plurality of fragments is displayed.

29. A computer program product stored on a recordable computer readable medium in a data processing system for specifying a cache policy for caching pages which include dynamic content, said computer program product comprising:
instruction for permitting a user to request one of said pages to be displayed, said one of said pages including a plurality of fragments;
instruction for executing an application which includes a plurality of servlets, each one of said plurality of servlets being executed to present a different one of said plurality of fragments, each one of said plurality of servlets being unchanged by said caching policy;
instruction for processing caching of said one of said pages separately from said application; and
instructions for specifying one of a plurality of different caching options for one of said plurality of fragments based on an update rate of content of said one of said plurality of servlets, said plurality of different caching options including either static caching, dynamic caching or no caching, content that is updated dynamically being cached using either static caching, dynamic caching, or no caching.

30. The product according to claim 29, further comprising instruction means for processing caching of each of said plurality of fragments separately from said application.

31. The product according to claim 29, wherein said instruction means for processing caching further comprises:
instruction for responding to internal cache requests; and
instruction for responding to external cache requests.

32. The product according to claim 29, further comprising instruction means for processing caching of said one of said pages within an application server included within said computer system.

33. The product according to claim 32, further comprising:
instruction for responding to internal cache requests, said internal cache requests being generated within said application server; and
instruction for responding to external cache requests, said external cache requests being generated outside said application server.

34. The product according to claim 29, wherein said instruction means for processing caching of said one of said pages further comprises:
instruction for receiving a request to display one of said plurality of fragments;
instruction for determining one of plurality of servlets associated with said one of said plurality of fragments; and
instruction for executing said one of said plurality of servlets, wherein said execution of said one of said plurality of servlets generates a displayable output.

35. The product according to claim 34, further comprising:
instruction for in response to a first request to display said one of said plurality of fragments, creating a cache entry including said output;
instruction for creating a cache entry identifier for identifying said cache entry utilizing a user identifier which identifies said user and caching options specified for said one of said plurality of servlets.

36. The product according to claim 35, further comprising:
instruction for creating said one of said plurality of servlets;
instruction for specifying said cache options for said one of said plurality of servlets; and
instruction for creating a servlet element for said servlet utilizing a servlet identifier and an indication of said specified cache options, wherein said servlet element is associated with said servlet.

37. The product according to claim 36, further comprising:
instruction for storing said servlet; and
instruction for storing said specification of said servlet options with said servlet.

38. The product according to claim 36, further comprising:
instruction for receiving a request to display said servlet element;
instruction for determining whether any cache entry is identified by said cache identifier;
instruction in response to a determination that no cache entry is identified by said cache identifier:
for retrieving said servlet associated with said servlet element;
for providing said user identifier to said servlet;
for executing said servlet utilizing said user identifier generating an output;
for storing said output as a cache entry;
for identifying said cache entry utilizing said cache identifier; and
for returning said cache entry to said user, wherein said output is displayed.

39. The product according to claim 36, further comprising:
instruction means for receiving a request to display said servlet element;
instruction means for determining whether any cache entry is identified by said cache identifier;
instruction means for in response to a determination that a cache entry exists which is identified by said cache identifier, returning said cache entry to said user, wherein said output is displayed.

40. The product according to claim 34, further comprising instruction means for outputting said cache entry, wherein said one of said plurality of fragments is displayed.

41. The product according to claim 34, further comprising instruction means for in response to subsequent requests to display said one of said plurality of fragments, retrieving said cache entry utilizing said cache identifier.

42. The product according to claim 41, further comprising instruction means for outputting said cache entry, wherein said one of said plurality of fragments is displayed.

* * * * *